(12) United States Patent
Ho

(10) Patent No.: US 6,856,109 B2
(45) Date of Patent: Feb. 15, 2005

(54) EFFICIENCY OPTIMIZATION CONTROL FOR PERMANENT MAGNET MOTOR DRIVE

(75) Inventor: Eddy Ying Yin Ho, Torrance, CA (US)

(73) Assignee: International Rectifier Corporation, El Segundo, CA (US)

(*) Notice: Subject to any disclaimer, the term of this patent is extended or adjusted under 35 U.S.C. 154(b) by 0 days.

(21) Appl. No.: 10/684,928

(22) Filed: Oct. 14, 2003

(65) Prior Publication Data

US 2004/0124809 A1 Jul. 1, 2004

Related U.S. Application Data

(60) Provisional application No. 60/418,735, filed on Oct. 15, 2002.

(51) Int. Cl.$^7$ ................................................ H02P 6/18
(52) U.S. Cl. ...................................... 318/254; 318/721
(58) Field of Search ............................... 318/138, 254, 318/439, 720–724

(56) References Cited

U.S. PATENT DOCUMENTS

| | | | |
|---|---|---|---|
| 5,057,759 A | 10/1991 | Ueda et al. | |
| 5,608,300 A | 3/1997 | Kawabata et al. | |
| 5,635,810 A | * 6/1997 | Goel | 318/719 |
| 5,864,217 A | 1/1999 | Lyons et al. | |
| 6,081,087 A | * 6/2000 | Iijima et al. | 318/439 |
| 6,137,257 A | * 10/2000 | Heber et al. | 318/701 |
| 6,396,229 B1 | 5/2002 | Sakamoto et al. | |
| 6,396,236 B1 | * 5/2002 | Luukko | 318/700 |
| 6,462,491 B1 | * 10/2002 | Iijima et al. | 318/254 |
| 6,462,492 B1 | * 10/2002 | Sakamoto et al. | 318/254 |
| 6,492,788 B1 | 12/2002 | Agirman et al. | |
| 6,552,509 B2 | 4/2003 | Veltman | |
| 6,670,784 B2 | 12/2003 | Odachi et al. | |

* cited by examiner

Primary Examiner—Bentsu Ro
(74) Attorney, Agent, or Firm—Ostrolenk, Faber, Gerb & Soffen, LLP

(57) ABSTRACT

A method and system for modifying an estimated rotor angle for improved efficiency in a PMSM drive system. A module monitors a run command, a torque command, and an estimated speed; and in response thereto, generates an output correction angle for modifying the estimated rotor angle. The output correction angle may be added to the estimated rotor angle. The output correction angle may be generated only for predetermined conditions of said run command, torque command, and speed. In particular, the output correction angle may be generated (1) when the run command is asserted, (2) when the torque command is above a predetermined level, and (3) when variations in the speed are within predetermined limits.

8 Claims, 4 Drawing Sheets

EFFICIENCY OPTIMIZATION CONTROL FOR PERMANENT MAGNET MOTOR DRIVE

CROSS-REFERENCE

This application is based upon and claims priority of U.S. Provisional Application Ser. No. 60/418,735 filed Oct. 15, 2002, incorporated by reference.

BACKGROUND OF THE INVENTION

1. Field of the Invention

The present invention relates to motor drives, and more particularly to a motor drive with improved rotor angle estimation for greater efficiency.

2. Description of the Related Art

Most low cost motor drive systems employ encoderless (sensorless) control techniques. The rotor angle is estimated based on a motor model or motor back emf sensing, for example. The motor efficiency and torque per ampere capability can be significantly reduced if an incorrect rotor angle is used for controlling a permanent magnet synchronous motor (PMSM). Rotor angle estimation errors may be due to inaccuracies in estimator (angle) parameters or in motor back emf feedback sensing.

FIG. 2 is a graph illustrating motor output power versus rotor angle error for a surface-mounted permanent magnet motor operating at rated current and speed. As can be seen from FIG. 2, the output power is maximized when rotor angle error is zero.

A known optimization scheme of background interest is described in F. Abrahamsen et al., IEEE/IAS Transactions on Industry Applications, Vol. 37, No. 6 (November/December 2001), "Efficiency-Optimized Control of Medium-Size Induction Motor Drives," incorporated by reference. In a related paper, "Energy Optimal Control of Induction Motor Drives," Inst. Of Energy Technology, Aalborg University (February 2000), incorporated by reference, F. Abrahamsen proposes several measures for driving induction motors at variable speed, including motor drives with pulse-width modulated voltage source inverters.

Inverters for three-phase motor drives are well known in the industry. Typically a DC bus supplies switched power to different phases of an AC motor. With this type of motor control, it is desirable to accurately estimate rotor angle, for example on the basis of current feedback, for high performance control of the motor.

A rotor angle estimation scheme of background interest is described in the present inventor's Ser. No. 10/294,201 filed Nov. 12, 2002; and Ser. No. 60/465,890 filed Apr. 25, 2003, both incorporated by reference.

SUMMARY OF THE INVENTION

The invention relates to an efficiency optimization control algorithm and to a control system using the algorithm, which can be applied to vector controlled permanent magnet AC motor drives to improve motor efficiency. The efficiency optimization algorithm and system continuously modify (using a control algorithm described herein) the estimated rotor angle until the torque command reaches its minimum value under steady state conditions.

According to an aspect of the invention, a system and method for modifying an estimated rotor angle for improved efficiency in a PMSM drive system, may comprise the steps of monitoring a run command, a torque command, and an estimated speed; and in response thereto, generating an output correction angle for modifying the estimated rotor angle. The output correction angle may be added to the estimated rotor angle. The output correction angle may be generated only for predetermined conditions of said run command, torque command, and speed. In particular, the output correction angle may be generated (1) when the run command is asserted, (2) when the torque command is above a predetermined level, and (3) when variations in the speed are within predetermined limits.

Other features and advantages of the present invention will become apparent from the following description of embodiments of the invention which refers to the accompanying drawings.

BRIEF DESCRIPTION OF THE DRAWING(S)

DESCRIPTION OF EMBODIMENTS OF THE INVENTION

Figure 1:
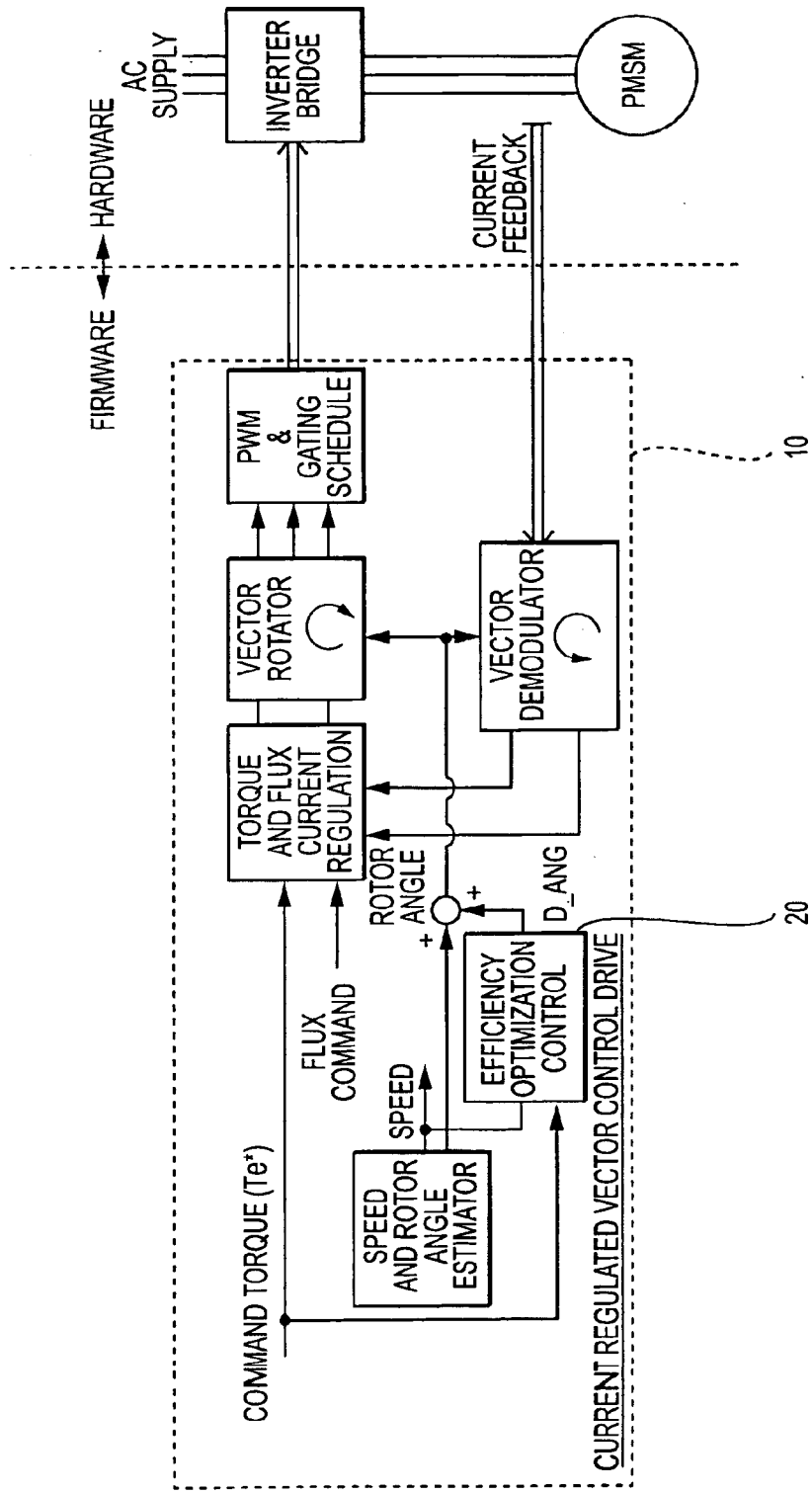
FIG. 1 is a block diagram of a vector-controlled motor drive system utilizing the invention.

FIG. 1 is a block diagram illustrating the placement of the efficiency control algorithm module 20 in a vector controlled system 10.

Figure 3:
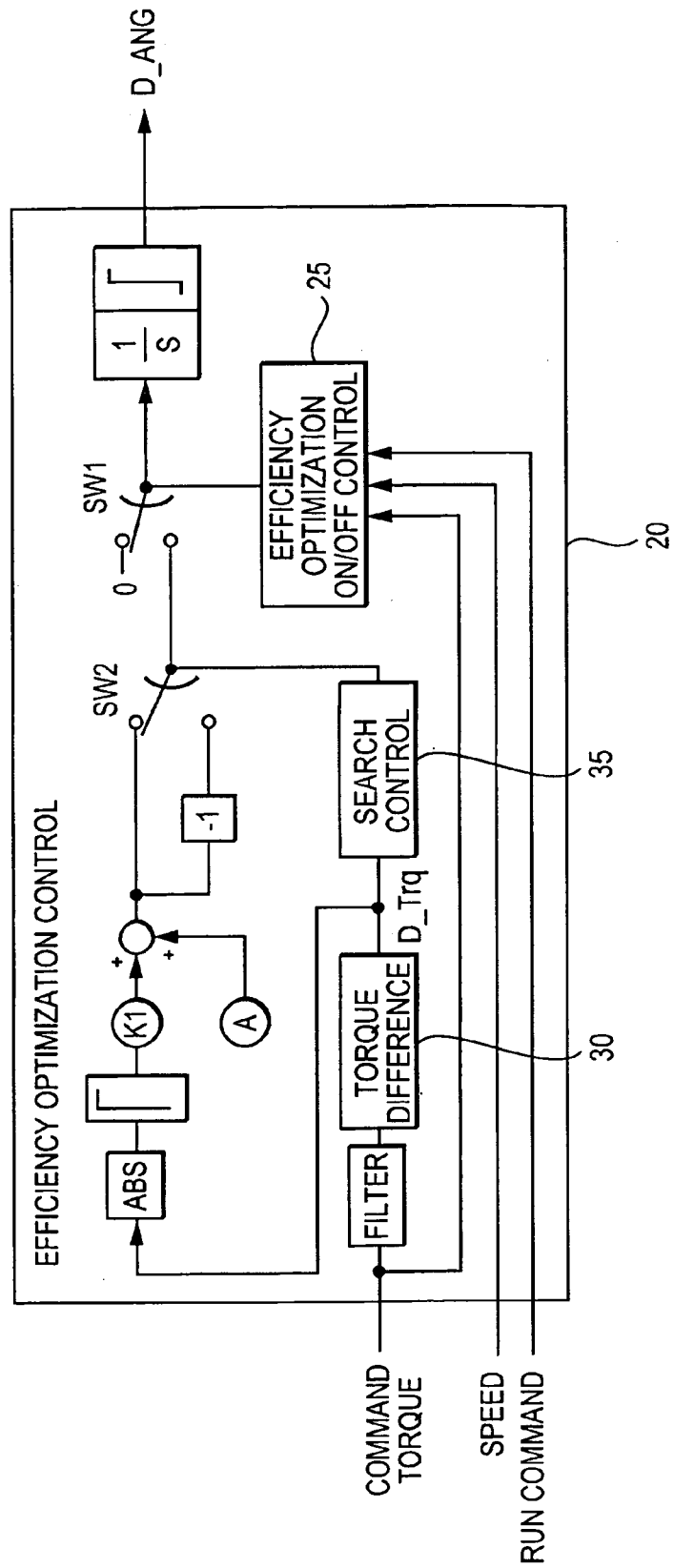
FIG. 3 is a detailed block diagram of the efficiency optimization controller.
Figure 4A:
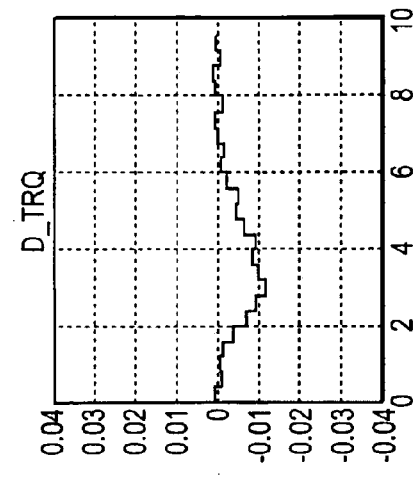
FIG. 4 is a series of graphs illustrating a simulation run of the efficiency control algorithm.
Figure 4B:
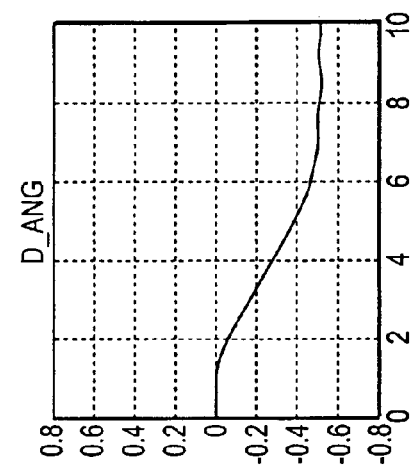
Figure 4C:
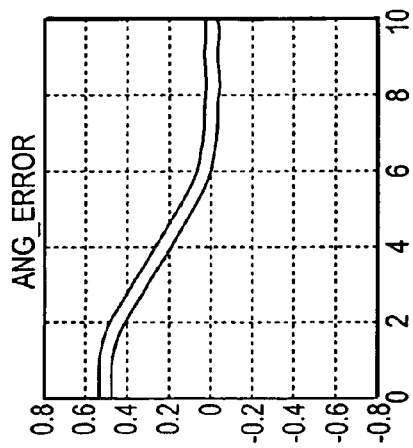
Figure 4D:
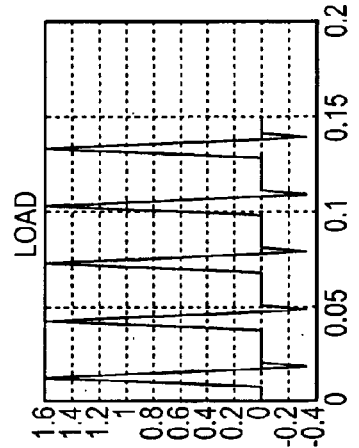
Figure 4E:
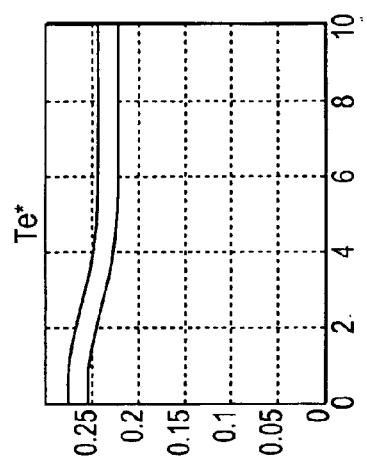
Figure 4F:
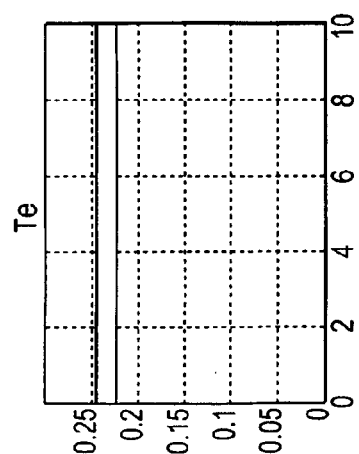

FIG. 3 shows the efficiency optimization control module in more detail. The efficiency optimization on/off control 25 monitors the drive run command, the estimated motor speed and the torque command. If (1) the run command is asserted, (2) speed variation (speed derivative) stays within certain bounds, and (3) motor current (torque command) is above a certain level then switch SW1 is activated. The output correction angle (D_Ang) is discharged (10 sec) to zero if any of the above three conditions cannot be satisfied.

The torque difference block 30 computes a difference (between present and a past sample) in the average (filtered 10 rad/sec) command torque. The search control block 35 determines the state of SW2 based on the sign of D_Trq. If the torque difference (D_Trq) is equal to or larger than zero then switch SW2 will switch state; otherwise SW2 will maintain (take no action) at its former state. Gain K1 is used to adjust the controller response and constant A provides an excitation test signal for searching minimum torque level.

Figure 2:
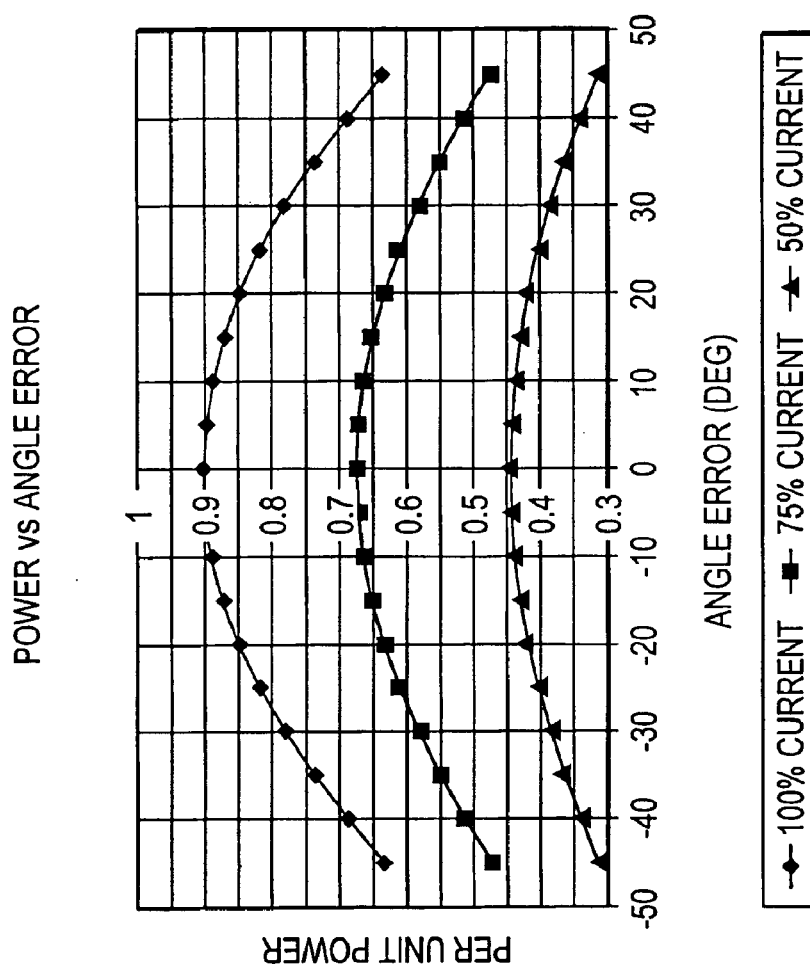
FIG. 2 is a graph illustrating motor output power versus rotor angle error for a PMSM.

The characteristics of power versus angle error (FIG. 2) can be predicted offline. Then K1 and A can be formulated based on the power (torque) sensitivity versus rotor angle error.

FIG. 4 shows a simulation run of the efficiency control algorithm. A surface-mounted permanent magnet motor driving a compressor load was used for this simulation run. An initial rotor angle error of 0.5 rad was used. When the efficiency optimization control was activated (at time=1.8 sec), the angle error was corrected and the drive torque per ampere was improved (Te* reduced in FIG. 4). Since the magnitude of motor current is proportional to command torque level, therefore the motor current was also reduced.

Definitions

D_Trq—Difference between filtered command torque (present and past samples)

D_Ang—Angle output of efficiency optimization controller (Rad.)
Te*—Torque command (N-M)
Te—Motor torque (N-M)
Load—Compressor load
Ang_Error—Angle difference between estimated angle and actual rotor angle (Rad.)

Although the present invention has been described in relation to particular embodiments thereof, many other variations and modifications and other uses will become apparent to those skilled in the art. Therefore, the present invention is not limited by the specific disclosure herein.

What is claimed is:

1. A method of modifying an estimated rotor angle for improved efficiency in a PMSM drive system, comprising the steps of:

monitoring a run command, a torque command, and an estimated speed; and in response thereto, generating an output correction angle for modifying said estimated rotor angle.

2. The method of claim 1, wherein said output correction angle is added to said estimated rotor angle.

3. The method of claim 1, wherein said output correction angle is generated only for predetermined conditions of said run command, torque command, and speed.

4. The method of claim 3, wherein said output correction angle is generated (1) when the run command is asserted, (2) when said torque command is above a predetermined level, and (3) when variations in said speed are within predetermined limits.

5. A motor drive system in which an estimated rotor angle is modified for improved efficiency in a PMSM drive system, comprising:

a module which estimates a rotor angle of a motor; and a module which monitors a run command, a torque command, and an estimated speed of said motor; and in response thereto, generates an output correction angle for modifying said estimated rotor angle.

6. The system of claim 5, wherein said output correction angle is added to said estimated rotor angle.

7. The system of claim 5, wherein said output correction angle is generated only for predetermined conditions of said run command, torque command, and speed.

8. The system of claim 7, wherein said output correction angle is generated (1) when the run command is asserted, (2) when said torque command is above a predetermined level, and (3) when variations in said speed are within predetermined limits.

* * * * *